(12) United States Patent
Yamamoto et al.

(10) Patent No.: US 7,545,107 B2
(45) Date of Patent: Jun. 9, 2009

(54) ELECTRODELESS DISCHARGE LAMP LIGHTING DEVICE AND LIGHTING APPARATUS

(75) Inventors: Shohei Yamamoto, Osaka (JP); Hiroshi Kido, Osaka (JP); Akira Nakajo, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 0 days.

(21) Appl. No.: 11/909,853

(22) PCT Filed: Mar. 28, 2006

(86) PCT No.: PCT/IB2006/050933

§ 371 (c)(1),
(2), (4) Date: Sep. 27, 2007

(87) PCT Pub. No.: WO2006/103623

PCT Pub. Date: Oct. 5, 2006

(65) Prior Publication Data

US 2008/0157693 A1 Jul. 3, 2008

(30) Foreign Application Priority Data

Mar. 28, 2005 (JP) .............................. 2005-093136

(51) Int. Cl.
*H01J 15/04* (2006.01)
(52) U.S. Cl. ...................................... 315/326
(58) Field of Classification Search ................. 315/246, 315/248, 326
See application file for complete search history.

(56) References Cited

U.S. PATENT DOCUMENTS 5,166,580 A 11/1992 Denneman et al.

(Continued)

FOREIGN PATENT DOCUMENTS

JP  63-158796  7/1988

(Continued)

OTHER PUBLICATIONS

English Language Abstract of JP 9-237687, Sep. 9, 1997.

(Continued)

*Primary Examiner*—Douglas W Owens
*Assistant Examiner*—Jianzi Chen
(74) *Attorney, Agent, or Firm*—Greenblum & Bernstein, P.L.C.

(57) ABSTRACT

There is provided an electrodeless discharge lamp lighting device with small size and low cost by simplifying a noise suppression part and a lighting apparatus having the electrodeless discharge lamp lighting device. A counter circuit of a frequency signal generating circuit repeatedly generates a frequency signal of which the amplitude is varied in a multi-step shape on the basis of an oscillation period of an oscillation circuit. An oscillation circuit outputs an oscillation signal of a frequency corresponding to the amplitude of the frequency signal. A drive circuit drives a switching element of an inverter circuit at the frequency of the oscillation signal and the inverter circuit applies a high-frequency voltage generated by the switching operation of the switching element to an induction coil to start up and light the electrodeless discharge lamp. That is, a high-frequency voltage which is varied at three discrete frequencies f1, f2, and f3 is repeatedly and periodically applied to the induction coil and thus a magnetic-component noise generated from a discharge lamp lighting device is distributed into three frequency components.

18 Claims, 15 Drawing Sheets

U.S. PATENT DOCUMENTS

| | | | |
|---|---|---|---|
| 5,306,987 | A | 4/1994 | Dakin et al. |
| 5,508,592 | A | 4/1996 | Lapatovich et al. |
| 5,680,015 | A * | 10/1997 | Bernitz et al. ............... 315/291 |
| 5,841,243 | A | 11/1998 | Hooper |
| 2007/0069647 | A1 | 3/2007 | Kakehashi et al. |
| 2007/0132399 | A1 | 6/2007 | Makimura et al. |
| 2007/0210723 | A1 | 9/2007 | Kumagai et al. |
| 2007/0262730 | A1 | 11/2007 | Ogasawara et al. |

FOREIGN PATENT DOCUMENTS

| | | | |
|---|---|---|---|
| JP | 4-212297 | | 8/1992 |
| JP | 9-237687 | | 9/1997 |
| JP | 10-208894 | | 8/1998 |
| JP | 10-228985 | | 8/1998 |
| JP | 10-228989 | | 8/1998 |
| JP | 2005071828 | * | 3/2005 |
| JP | 2005-135642 | | 5/2005 |
| WO | 2005/053364 | | 6/2005 |

OTHER PUBLICATIONS

English Language Abstract of JP 2005-135642, May 26, 2005.
English Language Abstract of JP 10-228989, Aug. 25, 1998.
English Language Abstract of WO 2005-053364, Sep. 6, 2005.
English Language Abstract of JP 10-208894, Aug. 7, 1998.
English Language Abstract of JP 10-228985, Aug. 25, 1998.
English Language Abstract of JP 4-212297, Aug. 3, 1992.

* cited by examiner (a)

(b)

Prior Art

ELECTRODELESS DISCHARGE LAMP LIGHTING DEVICE AND LIGHTING APPARATUS

BACKGROUND

1. Technical Field

The present invention relates to an electrodeless discharge lamp lighting device and a lighting apparatus.

2. Related Art

FIG. 21 illustrates a configuration of a conventional electrodeless discharge lamp lighting device. Reference numerals 50a and 50b are connection terminals suitable for connection to a power source. Reference numeral 50 denotes a current source for generating high-frequency pulse current from voltage the power source. An output terminal of the current source 50 is connected to an input terminal of a modulator 51 and the modulator 51 modulates the amplitude of the high-frequency pulse current to square-wave current having a predetermined duty cycle at a predetermined modulation frequency. An output terminal of the modulator 51 is connected to an input terminal of an amplitude adjusting circuit 52 for adjusting the amplitude of the square-wave modulated current. A low-pressure mercury discharge lamp La is connected between an output terminal of the amplitude adjusting circuit 52 and a ground terminal. Reference numeral 53 denotes a duty cycle adjusting circuit for adjusting a duty cycle and reference numeral 54 denotes a modulation frequency adjusting circuit for adjusting a modulation frequency. An output terminal of the duty cycle adjusting circuit 53 is connected to an input terminal of the modulator 51 and an output terminal of the modulation frequency adjusting circuit 54 is also connected to another input terminal of the modulator 51.

Accordingly, as well as the modulation frequency and the amplitude, the duty cycle of current in the shape of square-wave high-frequency pulse to be modulated can be adjusted, thereby enlarging the range of optical color point to be adjusted with a predetermined flux of light. At the same time, it is to rising the extent to which the position of the optical color point of light emitted from the lamp does not depend on the value of the flux of light from the lamp (for example, see Patent Document 1).

There is also known an electrodeless discharge lamp lighting device for controlling the modulation of light by varying the frequency of a voltage to be supplied to an electrodeless discharge lamp by the use of a light modulation adjuster (for example, see Patent Document 2).

[Patent Document 1] Japanese Patent No. 3092955
[Patent Document 2] Japanese Patent Laid-open No. 63-158796

The conventional discharge lamp lighting device disclosed in Patent Document 1 lights the discharge lamp of load by applying voltage to electrodes formed to a luminous body of the discharge lamp and electrolyzing gas in the luminous body. A circuit for such discharge lamp lighting device forms a current loop that an electric current flows from one output terminal in the circuit to one electrode of the luminous body via one lighting tube line, to another electrode of the luminous body via plasma in the luminous body, and to another output terminal of the circuit via another lighting tube line via.

Magnetic-component noises are generated by the current loop formed as described above, but it is sufficient that only the luminous body is externally visible. By covering most of the current loop, the magnetic-component noises can be blocked by shielding.

However, as disclosed in Patent Document 2, in the electrodeless discharge lamp lighting device having an induction coil for lighting an electrodeless discharge lamp, a magnetic field resulting from the induction coil is used as means for supplying power to the electrodeless discharge lamp. In this case, when the magnetic field is shielded with metal or the like, power cannot be supplied to plasma in the electrodeless discharge lamp, thereby making the lighting impossible. Moreover, the plasma in the electrodeless discharge lamp is formed in a loop shape and when most of the plasma in the loop shape is covered, light cannot be emitted externally, thereby deteriorating the optical output.

In such electrodeless discharge lamp lighting device having the induction coil, since the current loop cannot be covered with metal so as to suppress the magnetic-component noises, it is necessary to add a noise suppression part to the circuit elements, thereby causing increase in size and cost of the device.

SUMMARY

The present invention is contrived to solve the above-mentioned problems. An object of the present invention is to provide an electrodeless discharge lamp lighting device with small size and low cost by simplifying noise suppression parts and a lighting apparatus having the electrodeless discharge lamp lighting device.

According to a first aspect of the present invention, there is provided an electrodeless discharge lamp lighting device comprising: an induction coil wound in the vicinity of an electrodeless discharge lamp; a power supply circuit for outputting a DC voltage; an inverter circuit which has at least one switching element and which converts the DC voltage output from the power supply circuit into a high-frequency voltage and outputs the high-frequency voltage to the induction coil; and frequency varying means for dispersing the frequency of a noise by varying the frequency of the high-frequency voltage output from the inverter circuit to the induction coil at the time of lighting the electrodeless discharge lamp.

According to the configuration described above, since the frequency of the magnetic-component noise generated from the discharge lamp lighting device is dispersed, the peak value of the noise is decreased. Accordingly, in comparison with a case that the voltage applied to the induction coil has a single frequency, it is possible to reduce influence of noises on other devices and to greatly reduce the number of noise suppression parts, thereby accomplishing decrease in size and cost.

In a second aspect of the invention, the frequency varying means according to the first aspect may vary discretely the frequency of the voltage output from the inverter circuit to the induction coil.

According to the configuration described above, it is possible to enhance the degree of freedom in selecting of a frequency of the voltage applied to the induction coil, thereby selecting a frequency from a wide frequency range.

In a third aspect of the invention, the frequency varying means according to the first aspect may vary continuously the frequency of the voltage output from the inverter circuit to the induction coil.

According to the configuration described above, since the operating frequency of the inverter circuit is varied continuously, it is possible to reduce stress acting on the circuit elements.

In a fourth aspect of the invention, a frequency variation range of the voltage output from the inverter according to any one of the first to third aspects may be a range smaller than a value obtained by dividing an average frequency of the voltage output from the inverter circuit at the time of lighting the electrodeless discharge lamp by a value which is obtained by dividing an imaginary component of impedance across the induction coil while the electrodeless discharge lamp is in lighting the average frequency by a real component thereof.

According to the configuration described above, it is possible to greatly reduce a flickering phenomenon at the time of lighting.

In a fifth aspect of the invention, a frequency variation range of the voltage output from the inverter according to any one of the first to fourth aspects may be a range greater than a value obtained by dividing an average frequency of the voltage output from the inverter circuit at the time of lighting the electrodeless discharge lamp by a value which is obtained by dividing an imaginary component of impedance between the terminals of the induction coil at the time of starting up the electrodeless discharge lamp at the average frequency by a real component thereof.

According to the configuration described above, the middle extinction little occurs, thereby accomplishing improvement in reliability.

In a sixth aspect of the invention, a frequency variation range of the voltage output from the inverter circuit according to any one of the first to fifth aspects may be greater than a value obtained by multiplying an average frequency of the voltage output from the inverter circuit at the time of lighting the electrodeless discharge lamp by 0.005 and smaller than a value obtained by multiplying the average frequency by 0.1.

According to the configuration described above, it is possible to reduce stress of the inverter circuit, thereby accomplishing improvement in reliability.

In a seventh aspect of the invention, an average frequency of the voltage output from the inverter circuit at the time of lighting the electrodeless discharge lamp according to any one of the first to sixth aspects may be smaller than or equal to 500 kHz.

According to the configuration described above, since the noise suppression parts can be simplified, it is possible to accomplish decrease in size and cost and to accomplish increase in efficiency and size by means of lowering in frequency.

In an eighth aspect of the invention, a frequency variation range of the voltage output from the inverter circuit according to any one of the first to seventh aspects may be symmetric in a high frequency side and a low frequency side about a frequency at which power output from the inverter circuit to the induction coil at the time of lighting the electrodeless discharge lamp is the maximum.

According to the configuration described above, when the operating frequency of the inverter circuit is varied, it is possible to easily control the output power, thereby accomplishing decrease in device size and device cost.

According to a ninth aspect of the invention, there is provided a lighting apparatus comprising: the electrodeless discharge lamp lighting device according to any one of the first to eighth aspects, a main body which is fitted with the electrodeless discharge lamp lighting device, and an electrodeless discharge lamp supplied with power from the electrodeless discharge lamp lighting device.

According to the configuration of the lighting apparatus described above, the same advantage as any one of the first to eighth embodiments can be obtained.

BEST MODE FOR CARRYING OUT THE INVENTION

Hereinafter, exemplary embodiments of the present invention will be described with reference to the attached drawings.

First Embodiment

Figure 1:
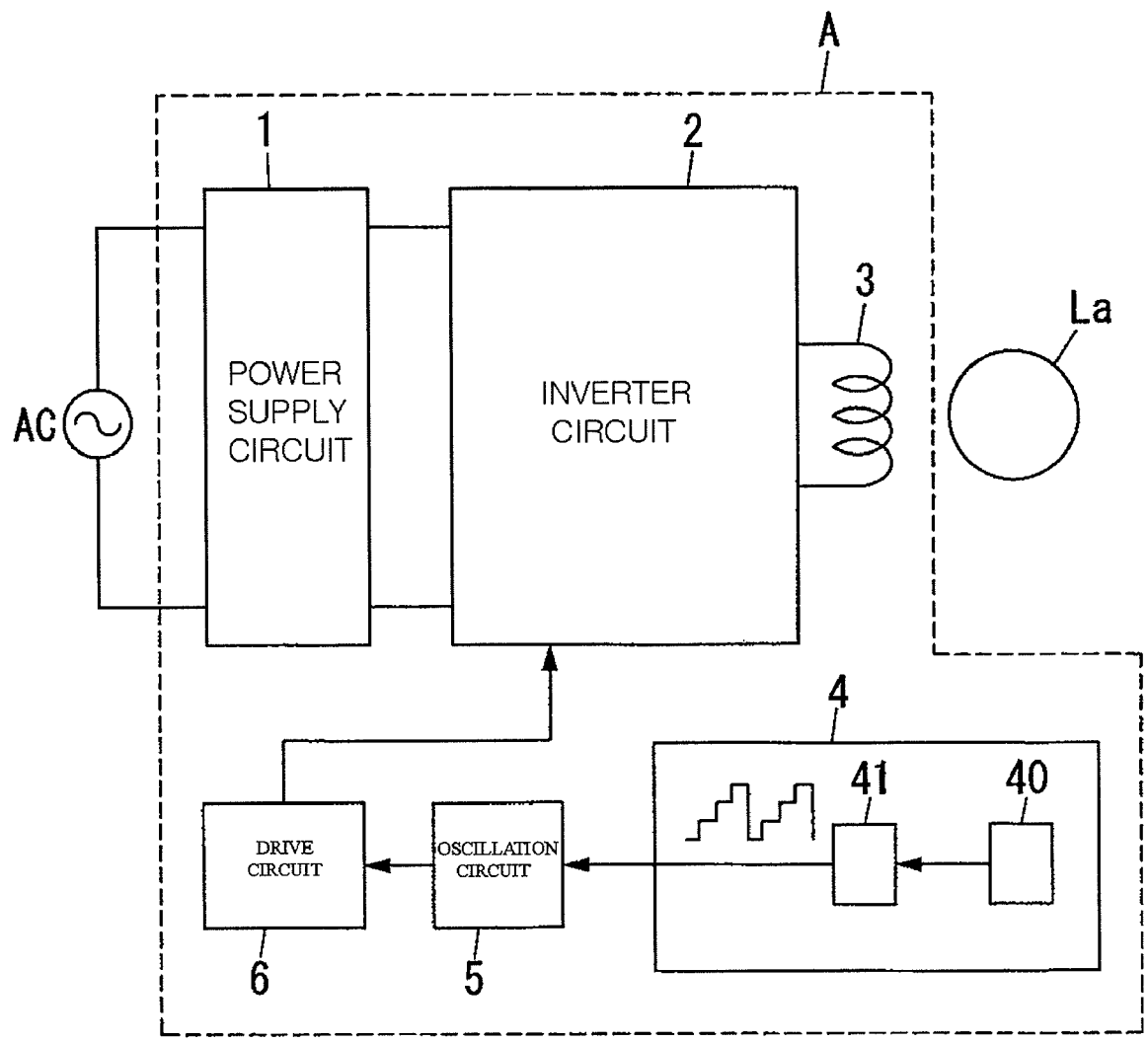
FIG. 1 is a circuit diagram illustrating an electrodeless discharge lamp lighting device according to a first embodiment of the present invention.

An electrodeless discharge lamp lighting device A according to a first embodiment of the present invention, as shown in FIG. 1, includes an induction coil 3 wound in the vicinity of an electrodeless discharge lamp La, a power supply circuit 1 for converting a current input from an AC power source into a predetermined DC output, an inverter circuit 2 which has at least one switching element and which converts the DC voltage output from the power supply circuit 1 into a high-frequency voltage and supplies the high-frequency voltage to the induction coil 3, a frequency signal generating circuit 4 for outputting a frequency signal, an oscillation circuit 5 for outputting an oscillation signal with a frequency corresponding to the frequency signal, and a drive circuit 6 for driving the switching element in the inverter circuit 2 in response to the oscillation signal.

The frequency signal generating circuit 4 includes an oscillation circuit 40 and a counter circuit 41. The counter circuit 41 repeatedly generates a frequency signal of which the amplitude is varied in a multi-step shape on the basis of the oscillation period of the oscillation circuit 40.

The oscillation circuit 5 outputs an oscillation signal of a frequency corresponding to the amplitude of the frequency signal, the drive circuit 6 drives the switching element of the inverter circuit 2 at the frequency of the oscillation signal, and the inverter circuit 2 starts up and light the electrodeless discharge lamp La by applying the high-frequency voltage generated by the switching operation of the switching element to the induction coil 3.

Figure 3:
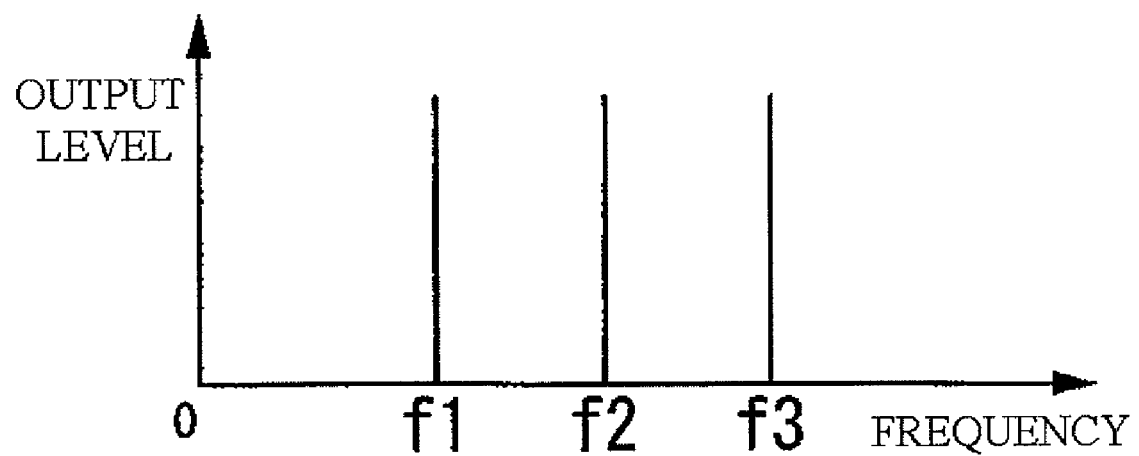
FIG. 3 is a diagram illustrating an FFT waveform of an applied voltage to an induction coil according to the first embodiment.

That is, in the first embodiment, the frequency of the voltage output from the inverter circuit 2 to the induction coil 3 is varied in a predetermined pattern. Specifically, high-frequency voltages varying in three discrete frequencies f1, f2, and f3 are repeatedly and periodically applied to the induction coil 3 and as shown in FIG. 3, three discrete frequencies f1, f2, and f3 exist in an FFT waveform of the voltage applied to the induction coil 3. Accordingly, since the magnetic-component noise generated from the discharge lamp lighting device A is dispersed into three frequency components, the peak value of the noises is lowered, thereby reducing the influence of noises on other devices. In addition, the noise suppression parts can be simplified, thereby accomplishing decrease in size and cost of the device.

In the first embodiment, it is possible to enhance the degree of freedom in selecting a frequency of the voltage applied to the induction coil 3, thereby selecting a frequency from a wide frequency range.

Second Embodiment

Figure 4:
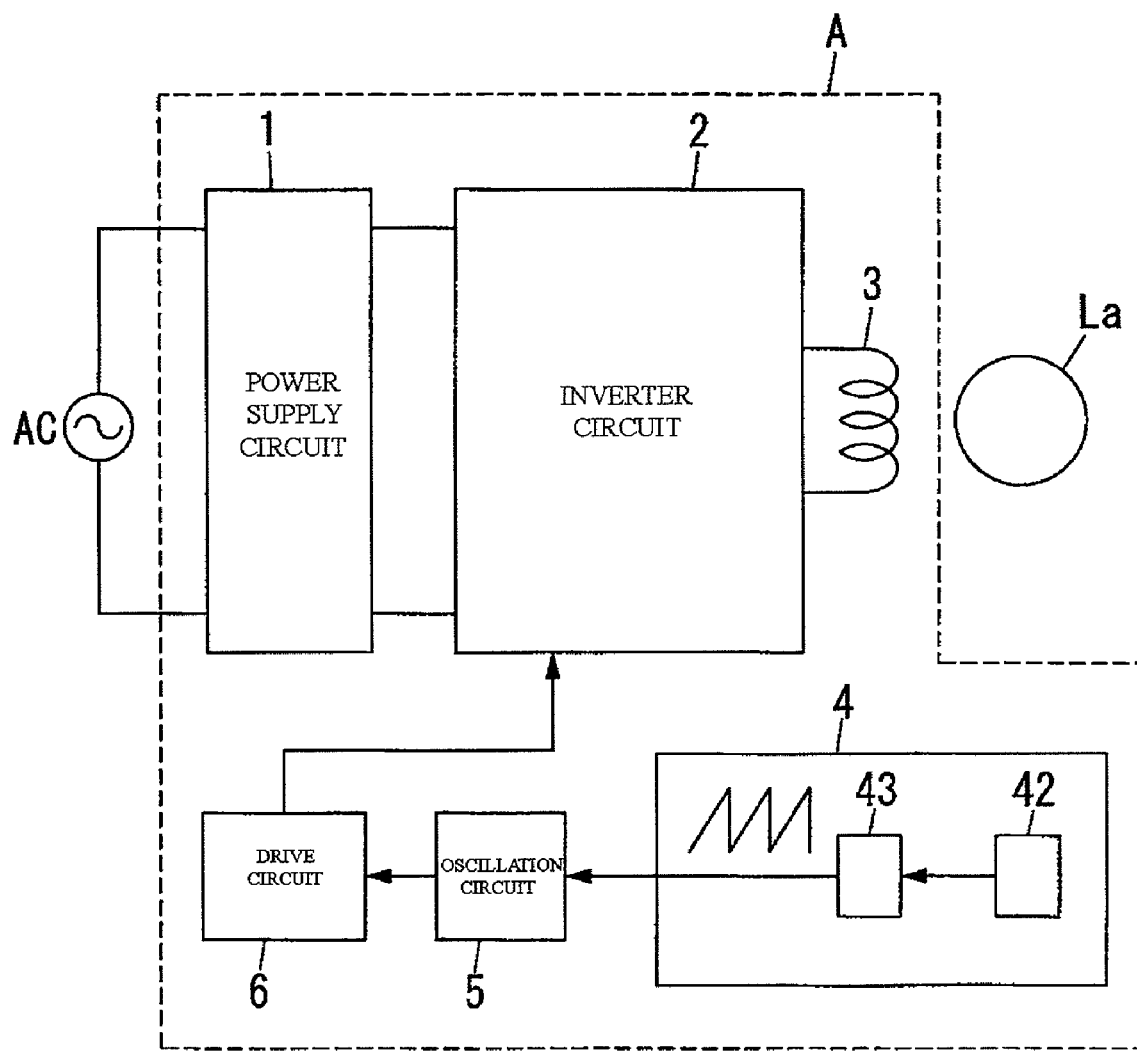
FIG. 4 is a circuit diagram illustrating an electrodeless discharge lamp lighting device according to a second embodiment of the invention.

An electrodeless discharge lamp lighting device A according to a second embodiment of the present invention, as shown in FIG. 4, includes an induction coil 3 wound in the vicinity of an electrodeless discharge lamp La, a power supply circuit 1 for converting a current input from an AC power source into a predetermined DC output, an inverter circuit 2 which has at least one switching element and which converts the DC voltage output from the power supply circuit 1 into a high-frequency voltage and supplies the high-frequency voltage to the induction coil 3, a frequency signal generating circuit 4 for outputting a frequency signal, an oscillation circuit 5 for outputting an oscillation signal with a frequency corresponding to the frequency signal, and a drive circuit 6 for driving the switching element in the inverter circuit 1 in response to the oscillation signal.

Figure 5:
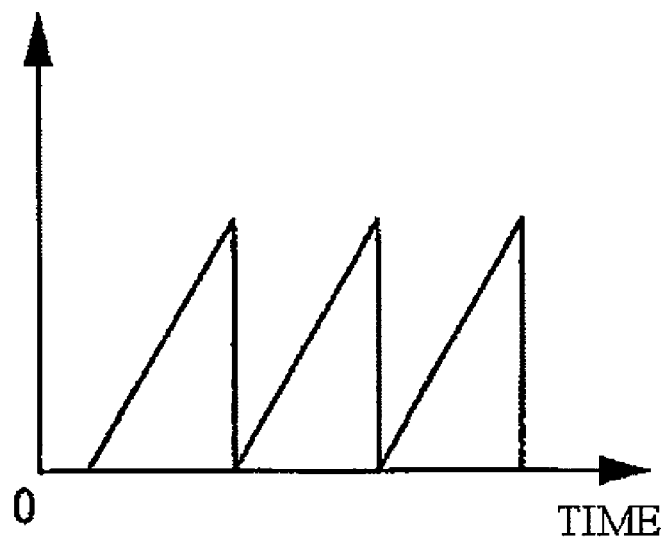
FIG. 5 is a diagram illustrating a waveform of a frequency signal according to the second embodiment.

The frequency signal generating circuit 4 includes a DC power supply circuit 42 and an integrator circuit 43. As shown in FIG. 5, the integrator circuit 43 repeatedly generates a frequency signal of which the amplitude is varied in a sawtooth waveform.

The oscillation circuit 5 outputs an oscillation signal with a frequency corresponding to the amplitude of the frequency signal, the drive circuit 6 drives the switching element of the inverter circuit 2 at the frequency of the oscillation signal, and the inverter circuit 2 starts up and light the electrodeless discharge lamp La by applying the high-frequency voltage generated by the switching operation of the switching element to the induction coil 3.

Figure 6:
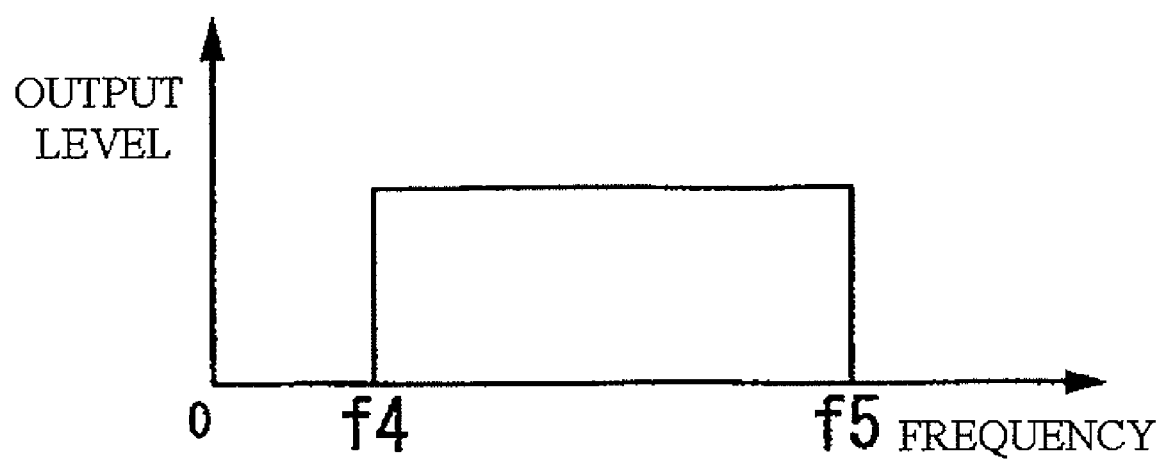
FIG. 6 is a diagram illustrating an FFT waveform of an applied voltage to an induction coil according to the second embodiment.

That is, in the second embodiment, the frequency of the voltage output from the inverter circuit 2 to the induction coil 3 is varied in a predetermined pattern. Specifically, high-frequency voltages varying continuously from a frequency f4 to a frequency f5 are repeatedly and periodically applied to the induction coil 3 and as shown in FIG. 6, the FFT waveform of the voltage applied to the induction coil 3 exists in the frequency range of f4 to f5. Accordingly, since the magnetic-component noise generated from the discharge lamp lighting device A is dispersed into the frequency range of f4 to f5, the peak value of the noises is lowered, thereby reducing the influence of noises on other devices. In addition, the noise suppression parts can be simplified, thereby accomplishing decrease in size and cost.

According to the second embodiment, since the operating frequency of the inverter circuit 2 is continuously varied, it is possible to reduce stress acting on the circuit elements.

Third Embodiment

Figure 7:
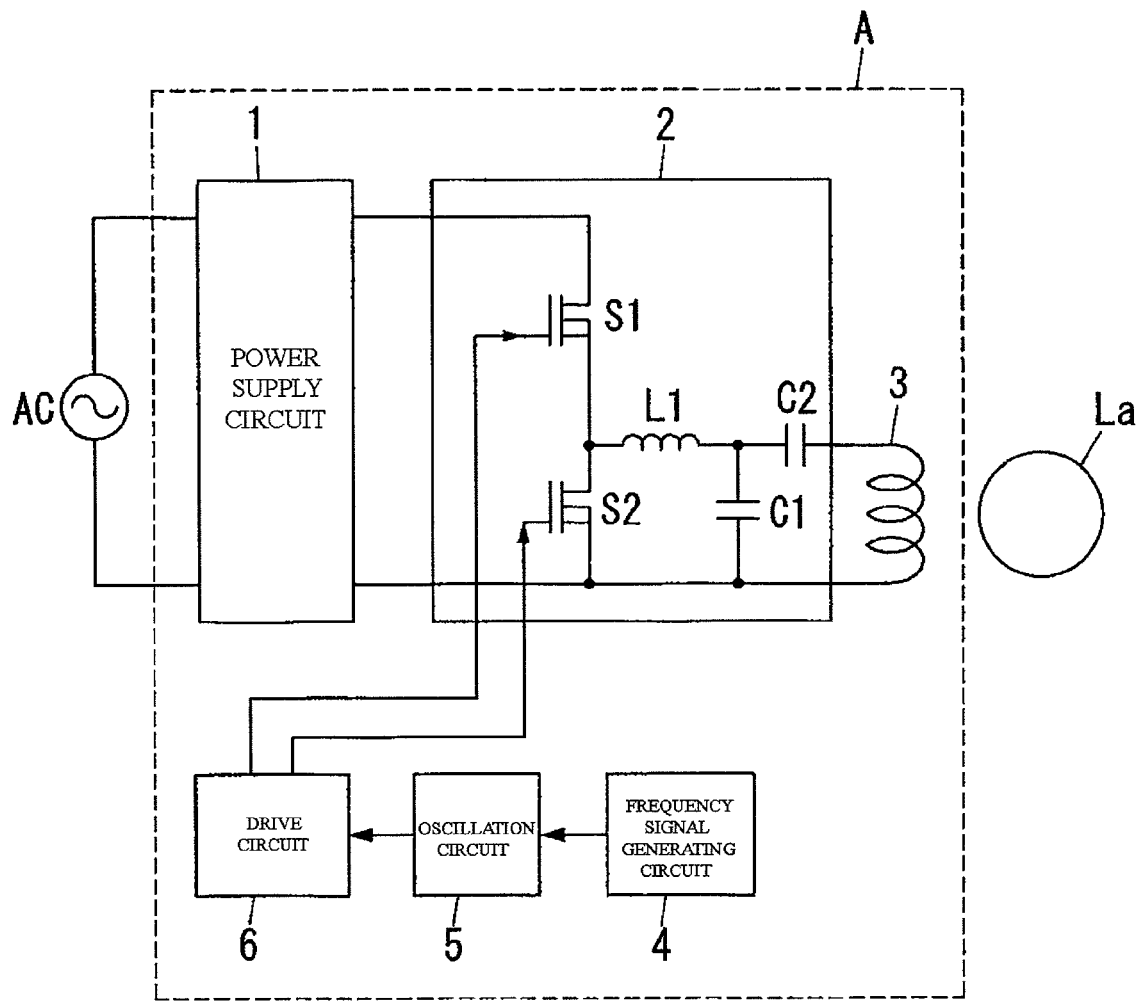
FIG. 7 is a circuit diagram illustrating an electrodeless discharge lamp lighting device according to a third embodiment of the invention.

In a third embodiment of the invention, the variation range Δf of the frequency f of the high-frequency voltage output from the inverter circuit 2 to the induction coil 3 in the electrodeless discharge lamp lighting device A according to the first or second embodiment shown in FIG. 7 is limited.

In FIG. 7, the inverter circuit 2 includes a series circuit of switching elements S1 and S2 having FET connected between the output terminals of the power supply circuit 1, a series circuit of an inductor L1 and a capacitor C1 connected in parallel to the switching element S2, and a capacitor C2 of which one end is connected to a connection node between the inductor L1 and the capacitor C1. An induction coil 3 is connected between both ends of the capacitor C1 through the capacitor C2. By alternately turning on and off the switching elements S1 and S2 by the use of the drive circuit 6, the high-frequency voltage is supplied to the induction coil 3, thereby starting up and lighting the electrodeless discharge lamp La.

Figure 8:
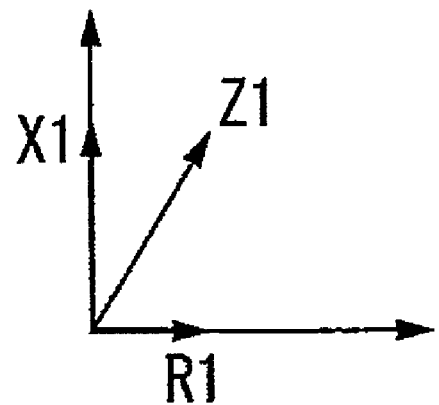
FIG. 8 is a diagram illustrating impedance across an induction coil at the time of lighting according to the third embodiment.

In the third embodiment, supposed that an average frequency of the voltage output from the inverter circuit 2 to the induction coil 3 at the time of lighting the electrodeless discharge lamp La is fav, an imaginary component of impedance Z1 across both ends of the induction coil 3 at the time of lighting the electrodeless discharge lamp La at the average frequency fav is X1, a real component thereof is R1 (see FIG. 8), and a value obtained by dividing the imaginary component X1 by the real component R1 is Q1=X1/R1, the variation range Δf of the frequency f of the high-frequency voltage output from the inverter circuit 2 to the induction coil 3 satisfies the following expression.

$$\Delta f \leq fav/Q1$$

Here, in the electrodeless discharge lamp lighting device A, unlike an electrode discharge lamp lighting device, since the output of the inverter circuit 2 is supplied to the plasma in the electrodeless discharge lamp La through the induction coil 3, the impedance Z1 across both ends of the induction coil 3 at the time of lighting has the imaginary component X1. The current supplied to the induction coil 3 includes a current component flowing as excitation current of the induction coil 3 which can be modeled in a parallel resistor to the plasma and which does not exist in the electrode discharge lamp, in addition to the current component supplied to the plasma in the electrode discharge lamp. Accordingly, the Q value of a load as seen from the inverter circuit 2 is great in comparison with the electrode discharge lamp and the variation in output power P is greater than the variation in operation frequency f.

Figure 9:
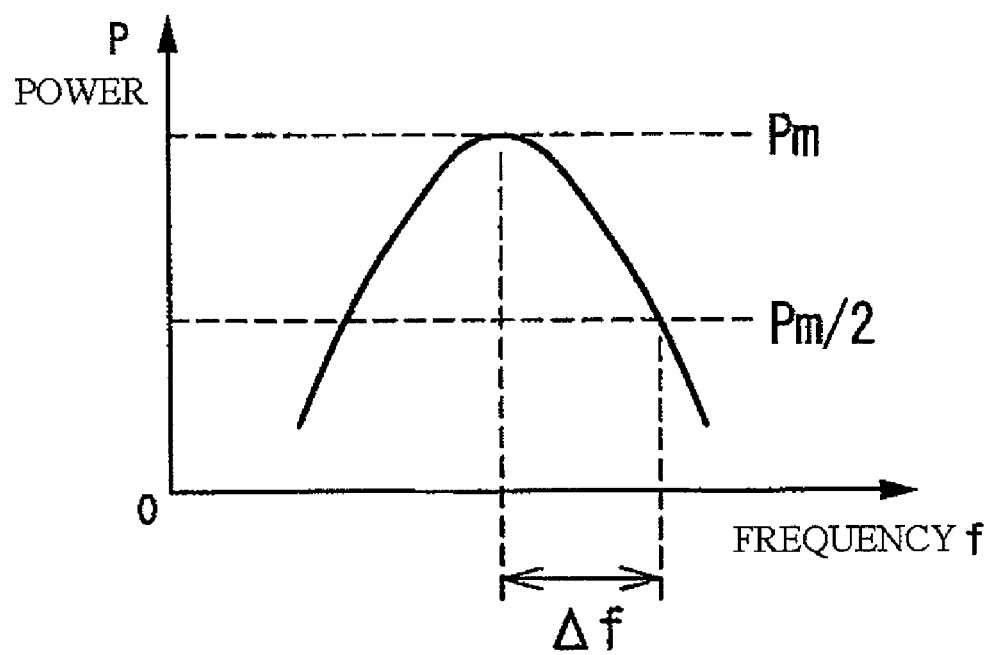
FIG. 9 is a diagram illustrating a relation in variation range between frequency and power according to the third embodiment.

When the maximum power of the power P output from the inverter circuit 2 to the induction coil 3 at the time of lighting the electrodeless discharge lamp La is Pm and the frequency f is deviated by $\Delta f = fav/Q1$ as shown in FIG. 9, the output power of the inverter circuit 2 varies by Pm/2, thereby making a user to feel a flickering phenomenon. However, in the third embodiment, it is possible to greatly reduce the flickering phenomenon by allowing the electrodeless discharge lamp to operate in the variation range $\Delta f < fav/Q1$ of frequency f.

Fourth Embodiment

Figure 10:
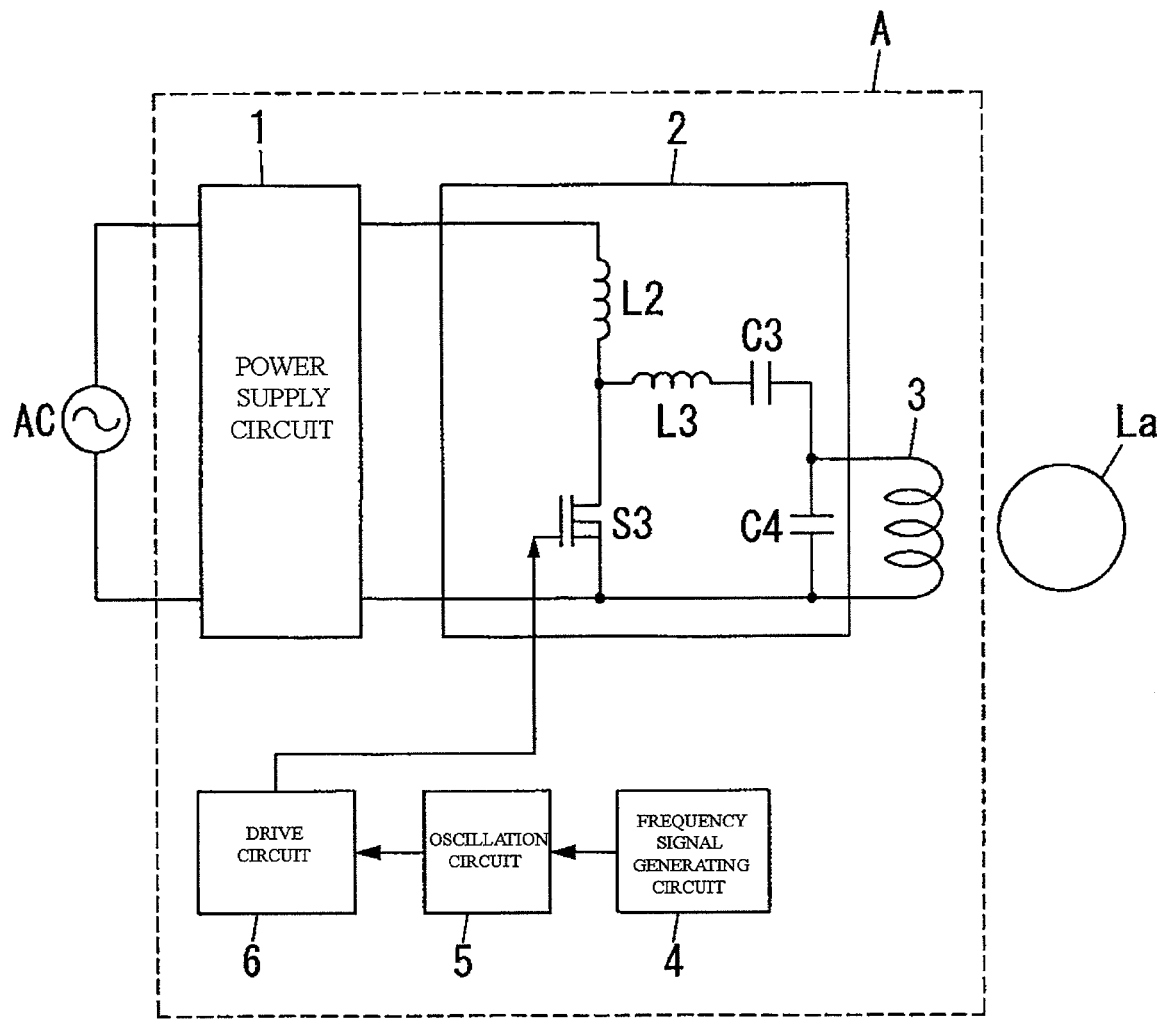
FIG. 10 is a circuit diagram illustrating an electrodeless discharge lamp lighting device according to a fourth embodiment of the invention.

In a fourth embodiment of the invention, the variation range $\Delta f$ of the frequency f of the high-frequency voltage output from the inverter circuit 2 to the induction coil 3 in the electrodeless discharge lamp lighting device A according to the first or second embodiment shown in FIG. 10 is limited.

In FIG. 10, the inverter circuit 2 includes a series circuit of an inductor L3 and a switching element S3 connected between the output terminals of the power supply circuit 1 and a series circuit of an inductor L3, a capacitor C3, and a capacitor C4 connected to the switching element S3. The induction coil 3 is connected to the capacitor C4. By alternately turning on and off the switching element S3 by the use of the drive circuit 6, the high-frequency voltage is supplied to the induction coil 3, thereby starting up and lighting the electrodeless discharge lamp La.

Figure 11:
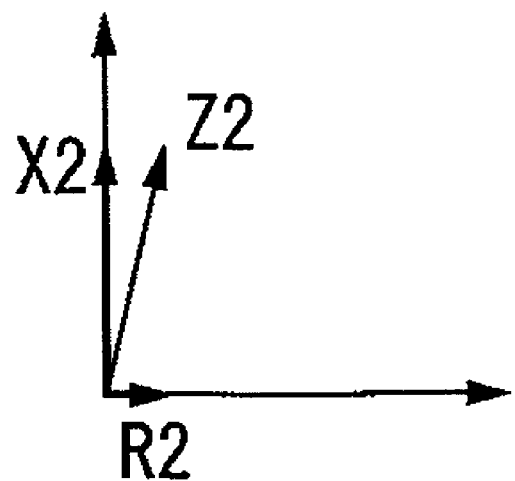
FIG. 11 is a diagram illustrating impedance across an induction coil at the time of lighting according to the fourth embodiment.

In the fourth embodiment, supposed that an average frequency of the voltage output from the inverter circuit 2 to the induction coil 3 at the time of lighting the electrodeless discharge lamp La is fav, an imaginary component of impedance Z2 across both ends of the induction coil 3 at the time of igniting the electrodeless discharge lamp La is X2, a real component thereof is R2 (see FIG. 11), and a value obtained by dividing the imaginary component X2 of the impedance Z2 by the real component R2 is Q2=X2/R2, the variation range $\Delta f$ of the frequency f of the high-frequency voltage output from the inverter circuit 2 to the induction coil 3 satisfies the following expression.

$$\Delta f > fav/Q2$$

Here, in the electrodeless discharge lamp lighting device A, unlike an electrode discharge lamp lighting device, the output of the inverter circuit 2 is supplied to the plasma in the electrodeless discharge lamp La through the induction coil 3. When the resistance value of the plasma is increased due to variation in surrounding temperature or the like, the current is not supplied to the plasma, but is consumed as excitation current. Accordingly, since only the excitation current flows even when a high potential is applied to the induction coil 3, it is difficult to supply power to the plasma and thus the middle extinction may occur. When the pause of lighting occurs, the plasma is not generated. Accordingly, the Q value of the induction coil 3 is very great. In this case, by periodically and repeatedly varying the frequency f of the high-frequency voltage output from the inverter circuit 2 to the induction coil 3, the induction coil 3 can be allowed to have a high potential, thereby re-generating the plasma.

Figure 12:
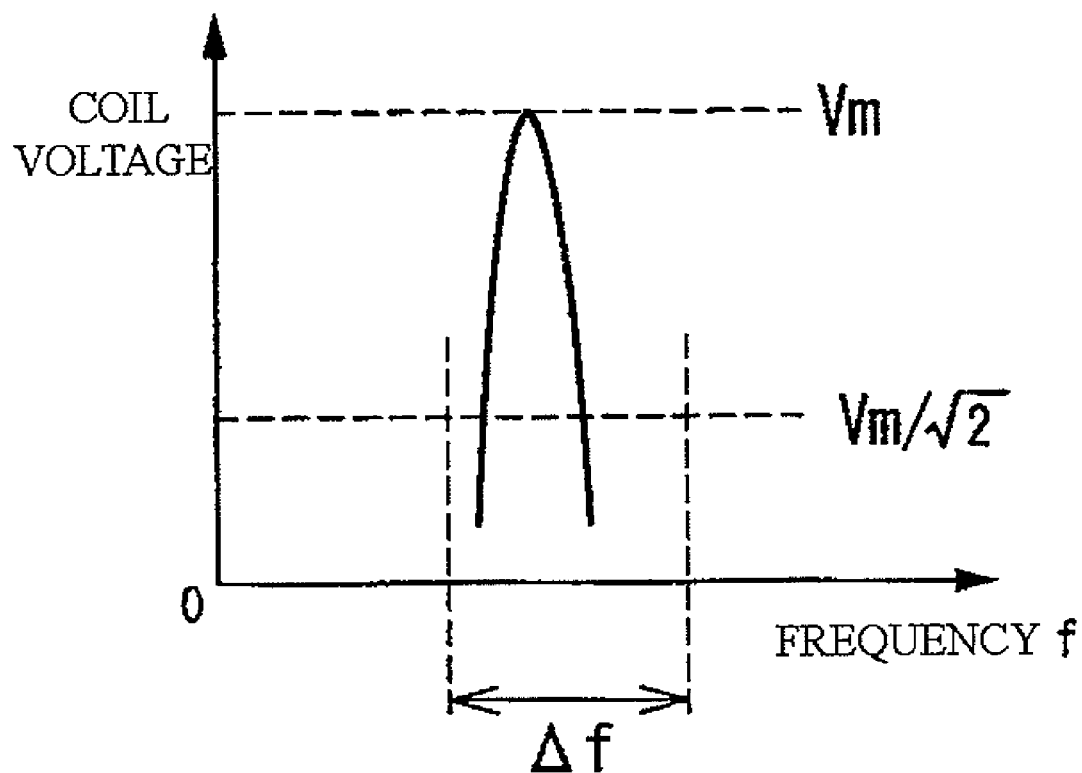
FIG. 12 is a diagram illustrating a relation in variation range between frequency and coil voltage according to the fourth embodiment.

FIG. 12 illustrates a voltage characteristic of the induction coil 3 with respect to the frequency. In case of the peak voltage Vm, the frequency variation range $\Delta f(>fav/Q2)$ is two times or more the frequency band when the voltage of the induction coil 3 is $Vm/\sqrt{2}$. In this case, by periodically and repeatedly varying the frequency f of the high-frequency voltage output to the induction coil 3 at the frequency variation range $\Delta f$ ($>fav/Q2$), the induction coil 3 can be allowed to have a high potential, thereby re-lighting the electrodeless discharge lamp La.

When the electrodeless discharge lamp La is extinct in the way after being lighted for a long time, the induction coil 3 disposed in the vicinity of the electrodeless discharge lamp La has a high temperature. When the electrodeless discharge lamp La is abruptly extinct after being lighted for a short time, the induction coil 3 has a low temperature. Accordingly, the temperature of the induction coil 3 is not uniform when the middle extinction occurs and thus the inductance of the induction coil 3 is not uniform due to the non-uniformity in temperature. Therefore, even when the middles extinction occurs, it is possible to completely re-light the electrodeless discharge lamp La by periodically and repeatedly the frequency f of the high-frequency voltage output to the induction coil 3 in the frequency variation range $\Delta f(>fav/Q2)$.

Fifth Embodiment

An electrodeless discharge lamp lighting device A according to a fifth embodiment has the same configuration of any one of the first to fourth embodiments. When an average frequency of the voltage output from the inverter circuit 2 to the induction coil 3 at the time of lighting the electrodeless discharge lamp La is fav, the variation range $\Delta f$ of the frequency f of the high-frequency voltage output from the inverter circuit 2 to the induction coil 3 satisfies the following expression.

$$0.005 \cdot fav < \Delta f < 0.1 \cdot fav$$

The inverter circuit 2 is designed to have high efficiency at the time of lighting and has decreased efficiency at the time of igniting. In the electrodeless discharge lamp lighting device A, it is necessary to apply a high voltage to the induction coil 3 at the time of igniting. Accordingly, at the time of igniting when large power is output, excessive stress acts on the inverter circuit 2.

Therefore, the Q value of the induction coil 3 at the time of igniting is designed to be 100 or more. Then, since the Q value is 100 or more, the frequency range allowing the induction coil 3 to have a high voltage is obtained by varying the frequency f of the voltage output from the inverter circuit 2 by 1/200 of the average frequency fav.

In addition, since it is necessary to supply power to the plasma of the electrodeless discharge lamp La through the induction coil 3, the load always has a reactance component. Accordingly, the inverter circuit 2 at the time of lighting carries out a circuit operation using resonance. When the variation range of the operating frequency of the inverter circuit 2 is set wide, a resonance circuit operates in a wide operation range, thereby making it difficult to control the switching operation of the inverter circuit 2 at a proper time. Therefore, by suppressing the frequency f of the voltage output from the inverter circuit 2 within a variation range corresponding to 1/10 of the average frequency fav, it is possible to properly control the switching operation of the inverter circuit 2.

Therefore, it is possible to reduce the stress of the inverter circuit 2, thereby accomplishing enhancement in reliability.

Sixth Embodiment

Figure 13:
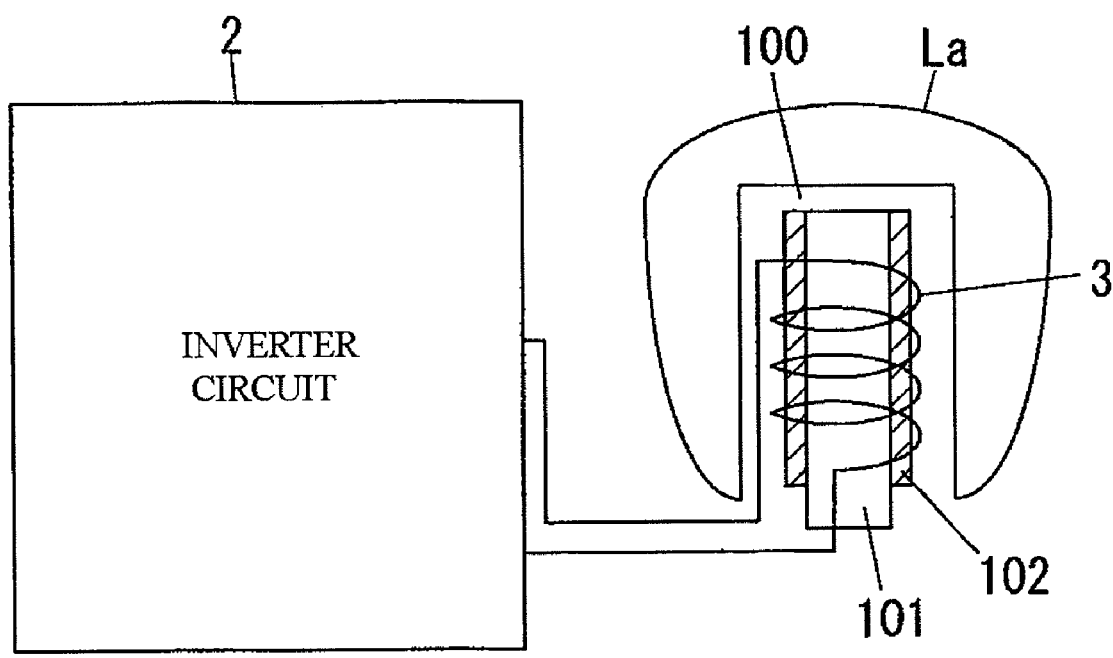
FIG. 13 is a diagram illustrating a schematic configuration of an electrodeless discharge lamp according to a sixth embodiment of the invention.

An electrodeless discharge lamp lighting device A according to a sixth embodiment has the same configuration as any one of the first to fifth embodiments. FIG. 13 is a cross-sectional view schematically illustrating an electrodeless discharge lamp La according to the sixth embodiment.

The electrodeless discharge lamp La has a concave portion 100 formed to extend from the outer surface to the center thereof. A rod-shaped metal body 101 is disposed in the concave portion 100, a magnetic body (core) 102 made of manganese is disposed on the outer circumference of the metal body 101, and the induction coil 3 is wound on the core 102.

In this way, since the induction coil 3 is disposed in the concave portion 100 of the electrodeless discharge lamp La, a potential can be easily generated in the electrodeless discharge lamp La, thereby enhancing an igniting property.

In the sixth embodiment, the average frequency of the voltage output from the inverter circuit 2 to the induction coil 3 is 500 kHz or less. Generally, by lowering the operating frequency of the inverter circuit 2, the stress acting on electronic components is reduced due to reduction in loss of the switching element of the inverter circuit 2, thereby accomplishing increase in efficiency and decrease in size. In addition, since the magnetic body 102 made of manganese can be used and a film capacitor can be used as the capacitor, it is possible to accomplish decrease in size of the elements and decrease in cost.

However, when the average operating frequency of the inverter circuit 2 is lowered to 500 kHz or less, the noise mainly include a magnetic component. Since the electrodeless discharge lamp lighting device A supplies power to the plasma in principle, the magnetic-component noise can be easily generated. Accordingly, when the operating frequency is lowered, the magnetic-component noise may be increased.

However, according to the sixth embodiment, by periodically and repeatedly varying the frequency of the high-frequency voltage output to the induction coil 3 at the time of igniting and lighting the electrodeless discharge lamp La, the noise can be reduced even when the inverter circuit 2 operates at the average operation frequency of 500 kHz or less. Therefore, the decrease in size and cost can be accomplished by reducing the number of noise suppression parts and the increase in efficiency and the decrease in size can be accomplished by lowering the frequency.

Seventh Embodiment

Figure 14:
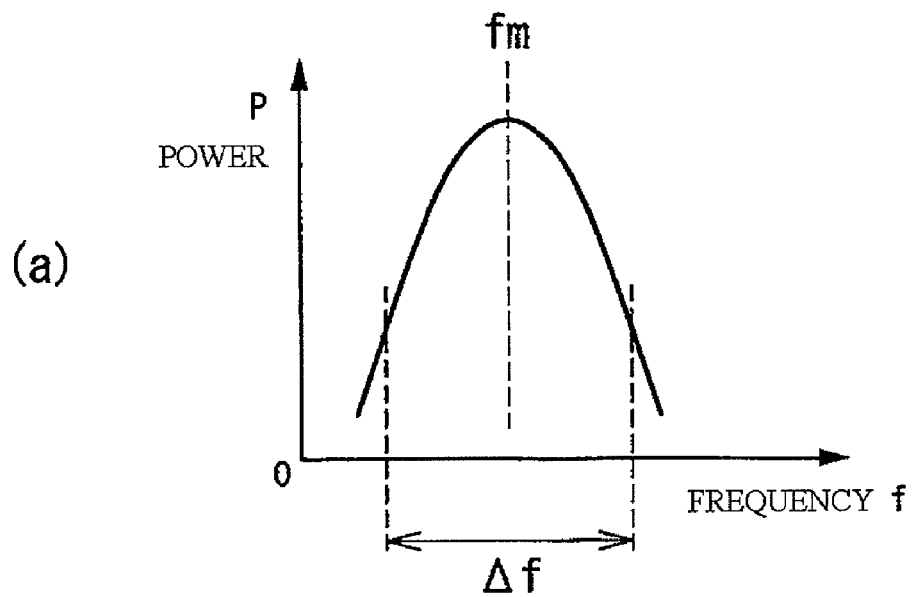
FIGS. 14A and 14B are diagrams illustrating a relation in variation range between frequency and power according to a seventh embodiment of the invention.
Figure 14:
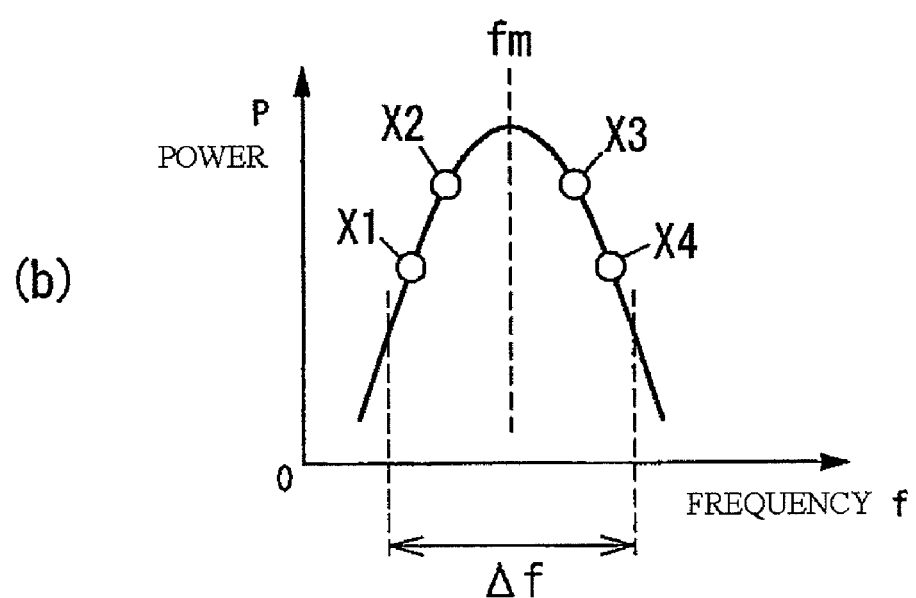

An electrodeless discharge lamp lighting device A according to a seventh embodiment of the invention has the same configuration as any one of the first to fifth embodiments. The variation range $\Delta f$ of the frequency f of the high-frequency voltage output from the inverter circuit 2 to the induction coil 3 at the time of lighting the electrodeless discharge lamp La, as shown in FIG. 14(a), is symmetric in a high frequency range and a low frequency range about the frequency fm at which power P output from the inverter circuit 2 to the induction coil 3 at the time of lighting is the maximum. The power P output from the inverter circuit 2 has the same characteristic in the high frequency range and the lower frequency range about the frequency fm.

Accordingly, the output control when the operating frequency of the inverter circuit 2 is varied becomes simpler, thereby accomplishing the decrease in size and cost of the device. For example, when the inverter circuit is allowed to operated at four points X1 to X4 in FIG. 14(b), the power control can be substantially performed to only two points by allowing the inverter circuit to operate at the points X1 and X4 and the points X2 and X3 for the same time.

Eighth Embodiment

Figure 15:
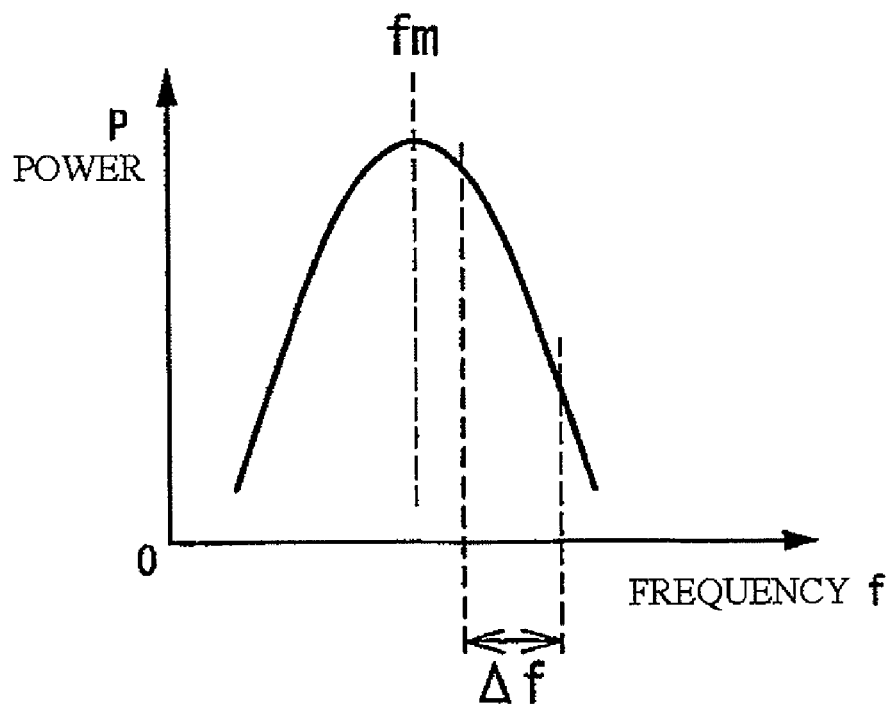
FIG. 15 is a diagram illustrating a relation in variation range between frequency and power according to an eighth embodiment of the invention.
Figure 16:
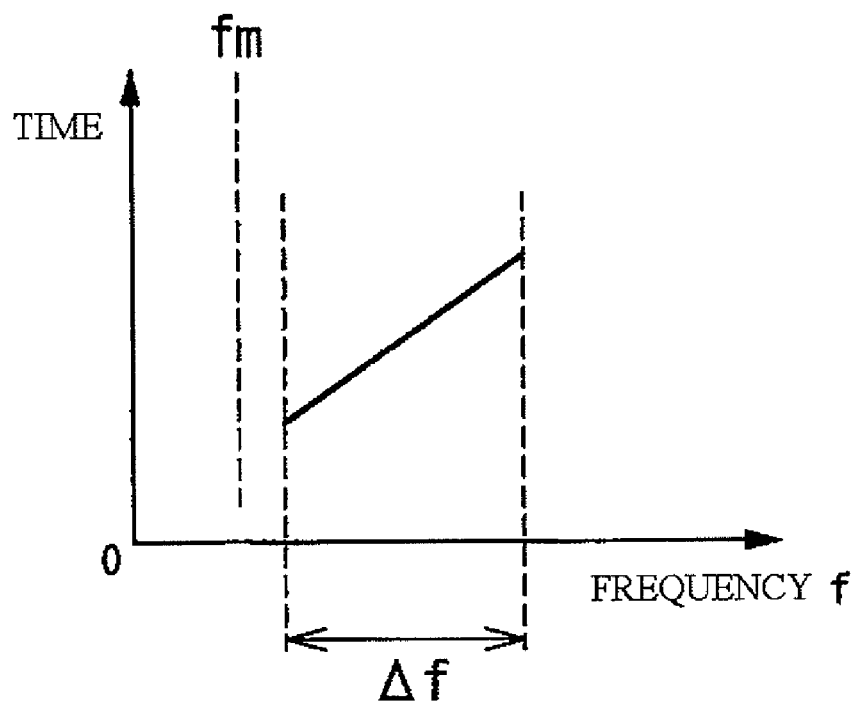
FIG. 16 is a diagram illustrating temporal distribution of frequency of an output voltage to an inverter circuit according to the eighth embodiment.

An electrodeless discharge lamp lighting device A according to an eighth embodiment of the invention has the same configuration as any one of the first to fifth embodiments. The variation range $\Delta f$ of the frequency f of the high-frequency voltage output from the inverter circuit 2 to the induction coil 3 at the time of lighting the electrodeless discharge lamp La is formed in a frequency range higher than the frequency fm at which the power P output from the inverter circuit 2 to the induction coil 3 at the time of lighting is the maximum, as shown in FIG. 15.

In the high frequency range, the current flowing in the switching element of the inverter circuit 2 operates in a lagged phase, regardless of the plasma state of the electrodeless discharge lamp La. On the other hand, in the lower frequency range, the current flowing in the switching element may operate in an advanced phase depending upon the plasma state of the electrodeless discharge lamp La, thereby applying stress to the switching element and thus destroying the switching element.

In addition, in the electrodeless discharge lamp lighting device A, unlike an electrode discharge lamp lighting device, since the output of the inverter circuit 2 is supplied to the plasma in the electrodeless discharge lamp La through the induction coil 3, impedance Z1 across both ends of the induction coil 3 at the time of lighting has an imaginary component X1. The current supplied to the induction coil 3 includes a current component flowing as excitation current of the induction coil 3 which can be modeled in a parallel resistor to the plasma and which does not exist in the electrode discharge lamp, in addition to the current component supplied to the plasma in the electrode discharge lamp. Accordingly, it is difficult to detect the plasma state of the electrodeless discharge lamp La by the use of a circuit structure and a complex circuit structure is required for embodying the detection of the plasma state.

Therefore, in the eighth embodiment, since the variation range $\Delta f$ is formed in the high frequency range, the current flowing in the switching element is in the lagged phase, thereby enhancing the reliability. In addition, it is possible to embody a stable operation without the circuit structure for detecting the plasma state, thereby accomplishing decrease in size and cost.

In temporal distribution of the frequency of the voltage output from the inverter circuit 2, the time in the low frequency side of the variation range $\Delta f$ is shorter than the time in the high frequency side. The magnetic-component noise is more easily generated at the time of low-frequency operation than at the time of high-frequency operation, but by more shortening the time in the low frequency side of the variation range $\Delta f$ than the time in the high frequency side, the generation of noise affecting external devices can be suppressed. In principles, the noise tends to be generated in inverse proportion to the frequency. Accordingly, by making the temporal distribution of the voltage output to the induction coil 3 be inversely proportional to the frequency, the effect is further enhanced. Therefore, it is possible to reduce the number of noise suppression parts, thereby accomplishing decrease in size and cost of the device.

Ninth Embodiment

Figure 17:
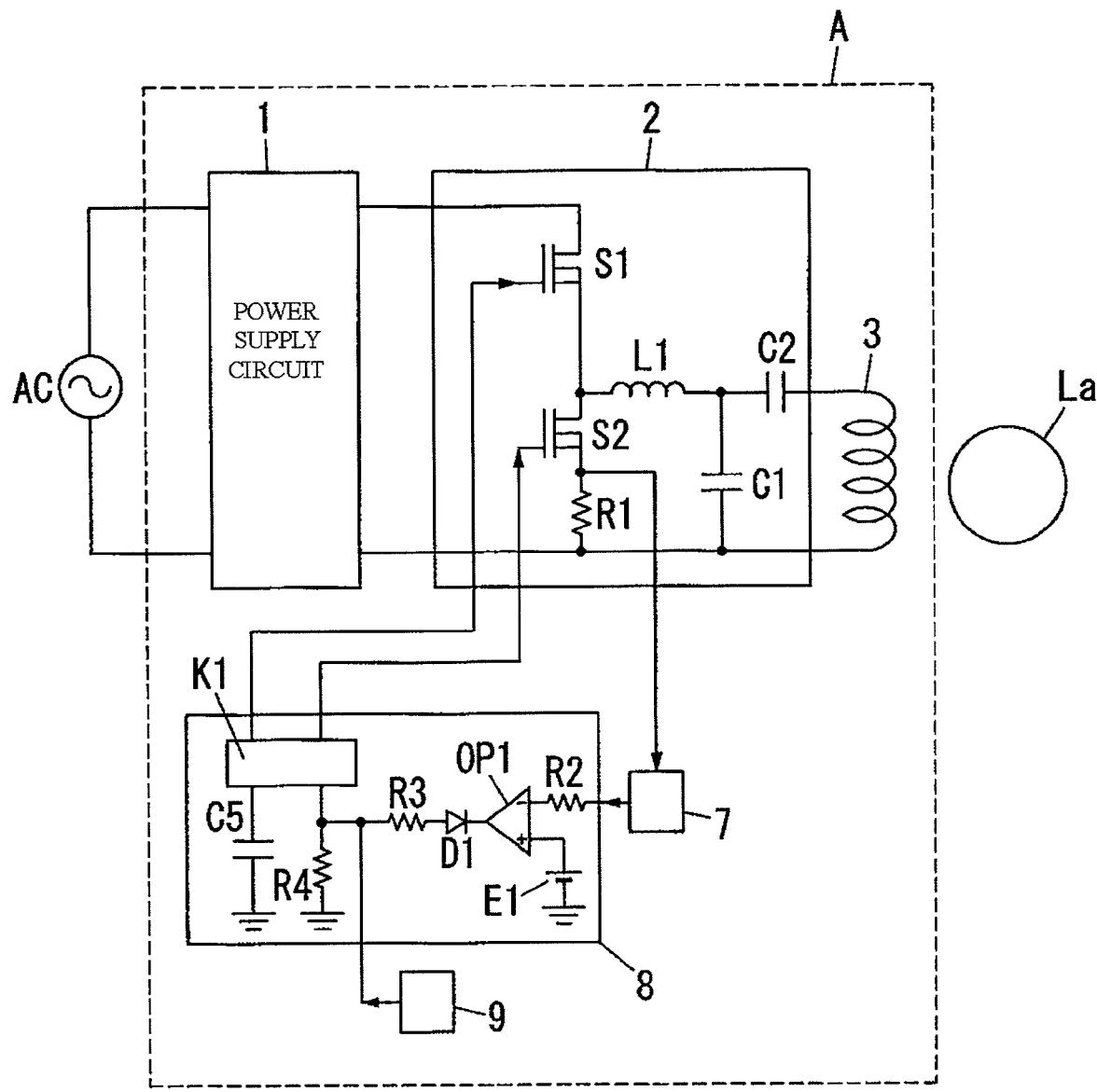
FIG. 17 is a circuit diagram illustrating an electrodeless discharge lamp lighting device according to a ninth embodiment of the invention.

As shown in FIG. 17, an electrodeless discharge lamp lighting device A according to a ninth embodiment of the invention includes an induction coil 3 wound in the vicinity of an electrodeless discharge lamp, a power supply circuit 1 for converting an AC input from an AC power source AC into a predetermined DC output, an inverter circuit 2 which has at least one switching element and which converts the DC voltage output from the power supply circuit 1 into a high-frequency voltage and supplies the high-frequency voltage to the induction coil 3, a detection signal delivering circuit 7, a power control circuit 8, and a frequency variation controller 9.

In the inverter circuit 2, a resistor R1 is connected in series to the switching element S2 of the inverter circuit 2 similar to the third embodiment. The voltage across the resistor R1 is output as a detected value of switching current to the detection signal delivering circuit 7. The detection signal delivering circuit 7 delivers the detected value of the switching current to the power control circuit 8.

The power control circuit 8 includes an operational amplifier OP1, a resistor R2 connected between the output terminal of the detection signal delivering circuit 7 and the input terminal of the operational amplifier OP1, a reference voltage source E1 connected to the non-inverted input terminal of the operational amplifier OP1, a series circuit of a diode D1, one end of which is connected to the output terminal of the operational amplifier OP1, and the resistor R3, an RC oscillation circuit K1, a resistor R4 connected to the resistor connection terminal of the RC oscillation circuit K1, and a capacitor C5 connected to the capacitor connection terminal thereof. The resistor connection terminal of the RC oscillation circuit K1 is also connected to the output terminal of the operational amplifier OP1 through the diode D1. The oscillation frequency of the RC oscillation circuit K1 is set on the basis of the resistance of the resistor connected to the resistor connection terminal and the capacitance of the capacitor connected to the capacitor connection terminal, and the oscillation output thereof is connected to the gate terminals of the switching elements S1 and S2.

When the switching current of the switching element S2 is increased and the detected value of current by the resistor R1 is greater than a reference voltage of the reference voltage source E1, the output voltage of the operational amplifier OP1 is inverted to the L level and the resistor R3 is added to the resistor for determining the oscillation frequency of the RC oscillation circuit K1, thereby increasing the oscillation frequency. Accordingly, since the operating frequencies of the switching elements S1 and S2 are increased, the power supplied by the inverter circuit 2 is decreased. That is, the power output from the inverter circuit 2 can be stabilized.

The output of the frequency variation controller 9 is connected to the resistor connection terminal of the RC oscillation circuit K1, and the frequency variation controller has a function of periodically and repeatedly varying the frequency f of the high-frequency voltage output from the inverter circuit 2 to the induction coil 3 at the variation range Δf according to any one of the first to eighth embodiments by varying the oscillation frequency of the RC oscillation circuit K1.

According to the ninth embodiment described above, it is possible to enhance the reliability due to the stabilization of the output power and it is also possible to accomplish the decrease in size and cost of the device.

Tenth Embodiment

Figure 18:
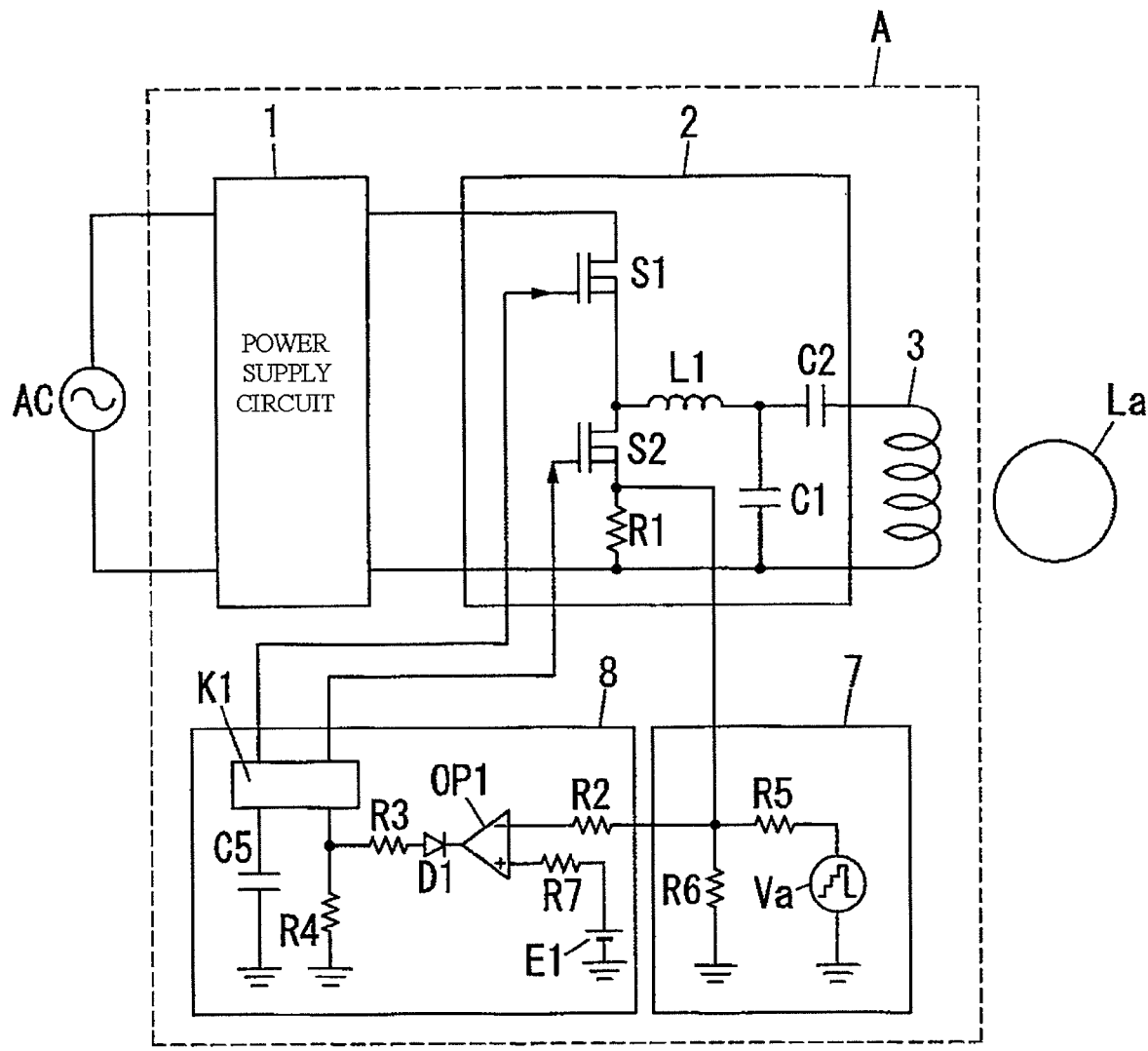
FIG. 18 is a circuit diagram illustrating an electrodeless discharge lamp lighting device according to a tenth embodiment of the invention.

An electrodeless discharge lamp lighting device A according to a tenth embodiment includes a configuration substantially similar to that of the ninth embodiment. However, as shown in FIG. 18, the frequency variation controller 9 is omitted and the detection signal delivering circuit 7 is different. In addition, in the power control circuit 8, a resistor R7 is disposed between the non-inverted input terminal of the operational amplifier OP1 and the reference voltage source E1.

The detection signal delivering circuit 7 includes a series circuit of a resistor R6, a resistor R5 connected in parallel to the resistor R6, and a stepped voltage generator Va. The detected signal from the resistor R1 is input to a connection point between the resistor R5 and the resistor R6 and the voltage of the connection point is output to the power control circuit 8.

Figure 2:
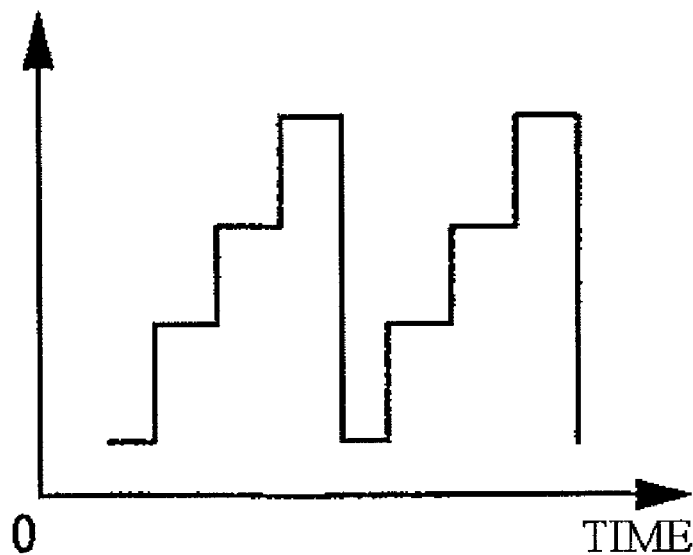
FIG. 2 is a diagram illustrating a waveform of a frequency signal according to the first embodiment.

The stepped voltage generator Va generates a step-shaped signal which is periodically repeated as shown in FIG. 2, and can periodically and repeatedly vary the frequency f of the high-frequency voltage output from the inverter circuit 2 by adding the step-shaped signal to the detected current signal.

According to the tenth embodiment described above, it is possible to enhance the reliability due to the stabilization of the output power and to cope with the noise by reducing the number of additional parts, thereby accomplishing the decrease in size and cost of the device.

Eleventh Embodiment

Figure 19:
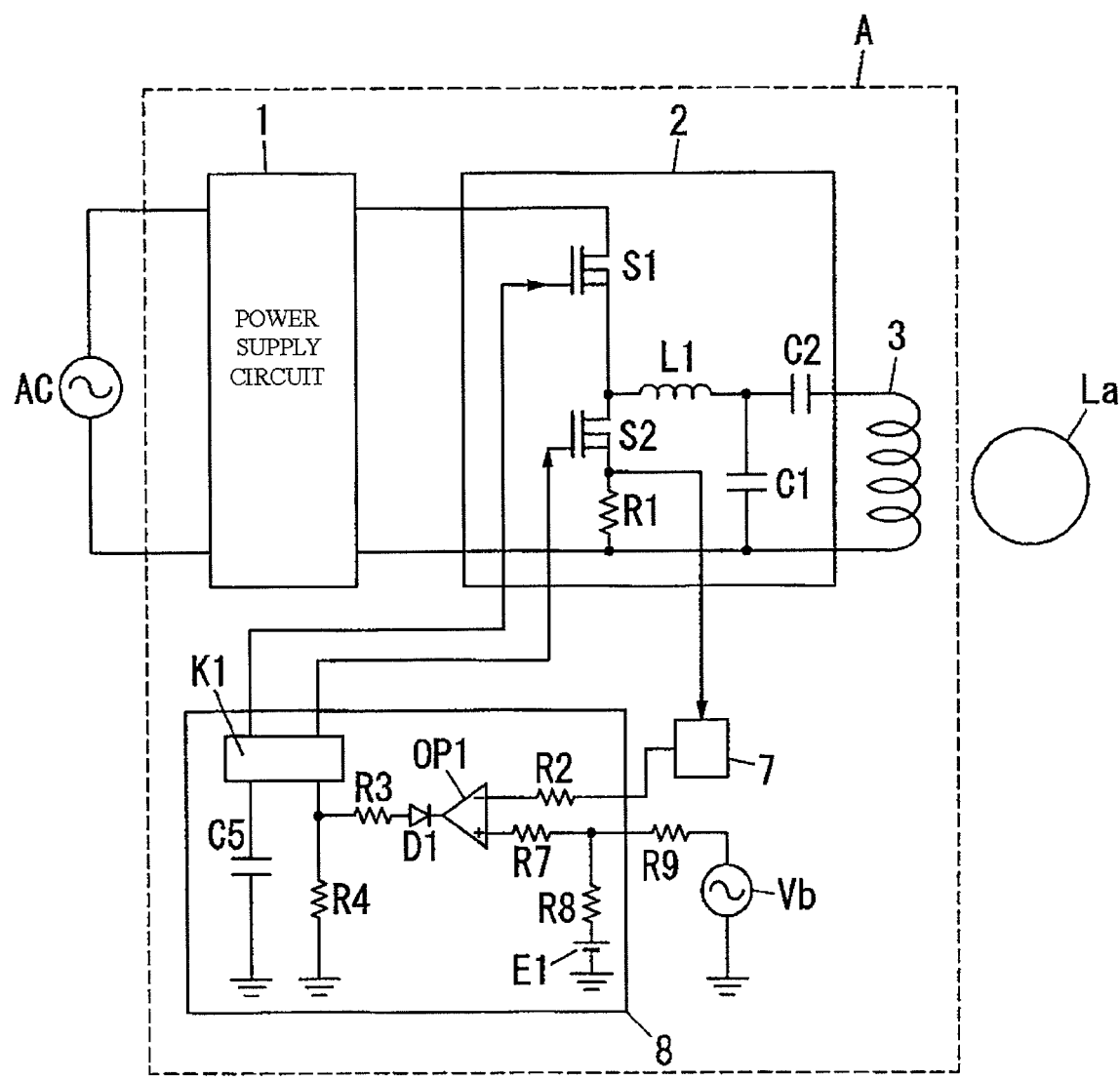
FIG. 19 is a circuit diagram illustrating an electrodeless discharge lamp lighting device according to an eleventh embodiment of the invention.

An electrodeless discharge lamp lighting device A according to an eleventh embodiment has a configuration substantially similar to that of the ninth embodiment. However, as shown in FIG. 19, the frequency variation controller 9 is omitted. In addition, in the power control circuit 8, a series of resistors R7 and R8 is disposed between the non-inverted input terminal of the operational amplifier OP1 and the reference voltage source E1, and a series circuit of a resistor R9 and a sine-wave voltage generator Vb is connected in parallel to the series circuit of the resistor R8 and the reference voltage source E1.

By adding the sine-wave voltage output from the sine-wave voltage generator Vb to the reference voltage of the reference voltage source E1 and periodically and repeatedly varying the reference voltage input to the operational amplifier OP1, the frequency f of the high-frequency voltage output from the inverter circuit 2 can be periodically and repeatedly varied.

According to the eleventh embodiment described above, it is possible to enhance the reliability due to the stabilization of the output power and to cope with the noise by reducing the number of additional parts, thereby accomplishing the decrease in size and cost of the device.

A sawtooth-wave voltage generator may be used instead of the sine-wave voltage generator Vb.

Twelfth Embodiment

Figure 20:
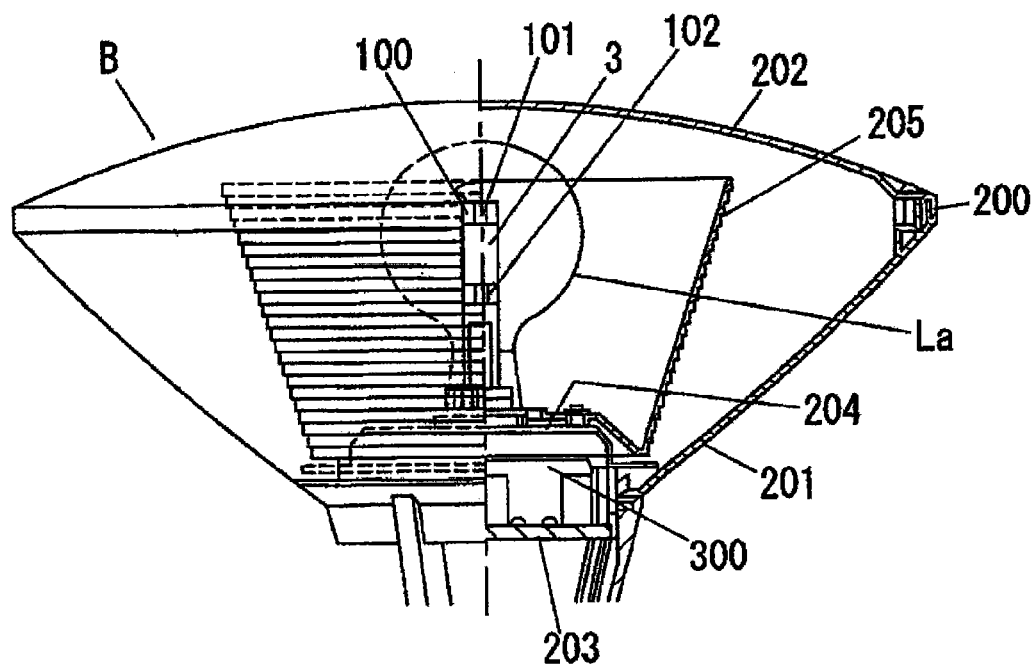
FIG. 20 is a partially exploded lateral view illustrating a lighting apparatus according to a twelfth embodiment of the invention.
Figure 21:
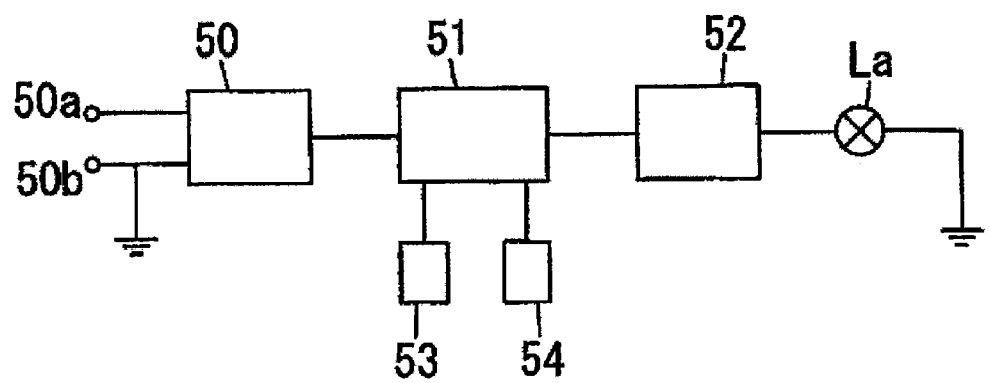
FIG. 21 is a circuit diagram illustrating a conventional electrodeless discharge lamp lighting device.

FIG. 20 is a partially exploded view illustrating a lighting apparatus B employing the electrodeless discharge lamp lighting device A according to any one of the first to eleventh embodiments as seen from a lateral side.

A main body 200 of the lighting apparatus B includes a bowl-shaped globe of which one end surface is opened, a cover 202 covering the opened surface of the globe 201, a support 203 disposed on the other end surface of the globe 201, a heat radiating plate 204 disposed to cover the support 203, and a tube-shaped diffusion plate 205 formed in such a shape that the width is increased from the outer circumference of the heat radiating plate 204 to the opened surface of the globe 201.

The electrodeless discharge lamp lighting device A is received in a circuit case 300, which is disposed on the support 203.

An electrodeless discharge lamp La has a concave portion 100 formed to extend from the outer surface to the center. A rod-shaped metal body 101 is disposed in the concave portion 100, a magnetic body (core) 102 made of manganese is disposed on the outer circumference of the metal body 101, and the induction coil 3 is wound on the core 102. The metal body 101 extends to the outside of the concave portion 100 and is connected to the heat radiating plate 204. Accordingly, the metal body 101 can be stabilized to a stable potential, thereby further improving the ignition property.

In addition, the metal body 101 can be fixed and the heat of the concave portion 100 can be radiated to the outside of the concave portion to lower the temperature of the induction coil 3 in the concave portion 100, by coupling the metal body 101 to the heat radiating plate 204. Accordingly, it is possible to suppress insulation deterioration of the induction coil 3. That is, it is possible to use a low-cost insulating material for the induction coil 3 and to enhance the reliability of the insulating material, thereby embodying an electrodeless discharge lamp lighting device A and a lighting apparatus B having a long lifetime. For an example of the lifetime, the lighting time at the time of attenuation of light flux by 70% is 60,000 hours. Accordingly, since the frequency of interchanging the electrodeless discharge lamp La is reduced and a mechanism of the lighting apparatus B for interchanging the electrodeless discharge lamp La can be simplified, it is possible to embody a low-cost lighting apparatus B.

According to the present invention described above, it is possible to provide an electrodeless discharge lamp lighting device with small size and low cost by simplifying the noise suppression parts and a lighting apparatus.

What is claimed is:

1. An electrodeless discharge lamp lighting device comprising:

an induction coil wound in the vicinity of an electrodeless discharge lamp;

a power supply circuit for outputting a DC voltage;

an inverter circuit which has at least one switching element and which converts the DC voltage output from the power supply circuit into a high-frequency voltage and outputs the high-frequency voltage to the induction coil; and a frequency varier that disperses the frequency of a noise by varying the frequency of the high-frequency voltage output from the inverter circuit to the induction coil at the time of lighting the electrodeless discharge lamp, wherein a frequency variation range $\Delta f$ of the high frequency voltage output from the inverter circuit satisfies the expression:

$$\Delta f < fav/Q1$$

wherein, fav represents an average frequency of the high frequency voltage output from the inverter circuit to the induction coil at the time of lighting the electrodeless discharge lamp, and Q1 represents the value (X1/R1) obtained by dividing an imaginary component X1 by a real component R1, wherein X1 is the imaginary component of an impedance Z1 across both ends of the induction coil at a time of lighting the electrodeless discharge lamp at the average frequency fav, and R1 is the real component thereof.

2. The electrodeless discharge lamp lighting device according to claim 1, wherein the frequency varier discretely varies the frequency of the voltage output from the inverter circuit to the induction coil.

3. The electrodeless discharge lamp lighting device according to claim 1, wherein the frequency varier continuously varies the frequency of the voltage output from the inverter circuit to the induction coil.

4. The electrodeless discharge lamp lighting device according to claim 1, wherein a frequency variation range $\Delta f$ of the voltage output from the inverter circuit satisfies the expression:

$$\Delta f > fav/Q2$$

Q2 represents a value (X2/R2) obtained by dividing an imaginary component X2 by a real component R2, wherein X2 is the imaginary component of an impedance Z2 across both ends of the induction coil at the time of starting up the electrodeless discharge lamp and R2 is the real component thereof.

5. The electrodeless discharge lamp lighting device according to claim 1, wherein a frequency variation range $\Delta f$ of the voltage output from the inverter circuit satisfies the expression:

$$0.005 fav < \Delta f < 0.1 fav.$$

6. The electrodeless discharge lamp lighting device according to claim 1, wherein an average frequency of the voltage output from the inverter circuit at the time of lighting the electrodeless discharge lamp is smaller than or equal to 500 kHz.

7. The electrodeless discharge lamp lighting device according to claim 1, wherein a frequency variation range of the voltage output from the inverter circuit is symmetric in a high frequency range and a low frequency range about a frequency at which power output from the inverter circuit to the induction coil at the time of lighting the electrodeless discharge lamp is a maximum.

8. A lighting apparatus comprising the electrodeless discharge lamp lighting device according to claim 1, a main body to which the electrodeless discharge lamp lighting device is fitted, and an electrodeless discharge lamp supplied with power from the electrodeless discharge lamp lighting device.

9. The electrodeless discharge lamp lighting device according to claim 2, wherein a frequency variation range $\Delta f$ of the voltage output from the inverter circuit satisfies the expression:

$$\Delta f > fav/Q2$$

Q2 represents a value (X2/R2) obtained by dividing an imaginary component X2 by a real component R2, wherein X2 is the imaginary component of an impedance Z2 across both ends of the induction coil at the time of starting up the electrodeless discharge lamp, and R2 is the real component thereof.

10. The electrodeless discharge lamp lighting device according to claim 2, wherein a frequency variation range $\Delta f$ of the voltage output from the inverter circuit satisfies the expression:

$$0.005 fav < \Delta f < 0.1 \ fav.$$

11. The electrodeless discharge lamp lighting device according to claim 2, wherein an average frequency of the voltage output from the inverter circuit at the time of lighting the electrodeless discharge lamp is smaller than or equal to 500 kHz.

12. The electrodeless discharge lamp lighting device according to claim 2, wherein a frequency variation range of the voltage output from the inverter circuit is symmetric in a high frequency range and a low frequency range about a frequency at which power output from the inverter circuit to the induction coil at the time of lighting the electrodeless discharge lamp is a maximum.

13. A lighting apparatus comprising the electrodeless discharge lamp lighting device according to claim 2, a main body to which the electrodeless discharge lamp lighting device is fitted, and an electrodeless discharge lamp supplied with power from the electrodeless discharge lamp lighting device.

14. The electrodeless discharge lamp lighting device according to claim 3, wherein a frequency variation range $\Delta f$ of the voltage output from the inverter circuit satisfies the expression:

$$\Delta f > fav/Q2$$

Q2 represents a value (X2/R2) obtained by dividing an imaginary component X2 by a real component R2, wherein X2 is the imaginary component of an impedance Z2 across both ends of the induction coil at the time of starting up the electrodeless discharge lamp, and R2 is the real component thereof.

15. The electrodeless discharge lamp lighting device according to claim 3, wherein a frequency variation range $\Delta f$ of the voltage output from the inverter circuit satisfies the expression:

$$0.005 fav < \Delta f < 0.1\ fav.$$

16. The electrodeless discharge lamp lighting device according to claim 3, wherein an average frequency of the voltage output from the inverter circuit at the time of lighting the electrodeless discharge lamp is smaller than or equal to 500 kHz.

17. The electrodeless discharge lamp lighting device according to claim 3, wherein a frequency variation range of the voltage output from the inverter circuit is symmetric in a high frequency range and a low frequency range about a frequency at which power output from the inverter circuit to the induction coil at the time of lighting the electrodeless discharge lamp is a maximum.

18. A lighting apparatus comprising the electrodeless discharge lamp lighting device according to claim 3, a main body to which the electrodeless discharge lamp lighting device is fitted, and an electrodeless discharge lamp supplied with power from the electrodeless discharge lamp lighting device.

\* \* \* \* \*